(12) United States Patent
Jin-No et al.

(10) Patent No.: US 8,101,118 B2
(45) Date of Patent: Jan. 24, 2012

(54) COUNTERCURRENT DIRECT-HEATING-TYPE HEAT EXCHANGER

(75) Inventors: Yoshinori Jin-No, Tokyo (JP); Hirokazu Oota, Tokyo (JP); Yukihito Sasaki, Niihama (JP); Shinsuke Suganuma, Niihama (JP)

(73) Assignee: Sumitomo Metal Minning Co., Ltd., Tokyo (JP)

( * ) Notice: Subject to any disclaimer, the term of this patent is extended or adjusted under 35 U.S.C. 154(b) by 279 days.

(21) Appl. No.: 12/458,598

(22) Filed: Jul. 16, 2009

(65) Prior Publication Data

US 2010/0019422 A1    Jan. 28, 2010

(30) Foreign Application Priority Data

Jul. 22, 2008   (JP) .................................. 2008-188083

(51) Int. Cl.
  *C21B 7/00* (2006.01)
(52) U.S. Cl. ........................................ 266/175; 165/168
(58) Field of Classification Search .................. 266/175; 165/168, 159
See application file for complete search history.

(56) References Cited

U.S. PATENT DOCUMENTS 4,893,672 A * 1/1990 Bader ............................ 165/163
2010/0019422 A1* 1/2010 Jin-No et al. .................. 266/175

FOREIGN PATENT DOCUMENTS

JP          05-026429 A      2/1993
JP          06-238160 A      8/1994

* cited by examiner

*Primary Examiner* — Scott Kastler
(74) *Attorney, Agent, or Firm* — Edwards Wildman Palmer LLP (57) ABSTRACT

The countercurrent direct-heating-type heat exchanger that is able to suppress drift in the case when a fluid to be heated is supplied. The heat exchanger is equipped with a feed pipe, a feed nozzle, ring-like straightening plates and umbrella-type dispersing plates of the above fluid to be heated, characterized in that the above feed nozzle has the shape of a pipe having a circular cross section and the dimension satisfying the following formula (1) and formula (2):

$Ln/Dn \geq 1$     Formula (1)

wherein, Ln indicates the length of the feed nozzle; and Dn indicates the inside diameter of the feed nozzle; and $1.5 \leq Sp/Sn \leq 2.0$     Formula (2)

wherein, Sp indicates the inner cross-sectional area of the feed pipe; and Sn indicates the inner cross-sectional area of the feed nozzle.

19 Claims, 4 Drawing Sheets

COUNTERCURRENT DIRECT-HEATING-TYPE HEAT EXCHANGER

BACKGROUND OF THE INVENTION

1. Field of the Invention

The present invention relates to a countercurrent direct-heating-type heat exchanger, in more detail, to a countercurrent direct-heating-type heat exchanger that is able to suppress the drift in the case when a fluid to be heated is supplied, to prevent local abrasion of the members and also to carry out efficient heat exchange, wherein heat exchange is carried out, while making a fluid to be heated inflow from its top and outflow from its bottom, and at the same time, making a heating medium inflow from its bottom and outflow from its top. It should be noted that, the fluid to be heated is generally a material to be heated having fluidity including, for example, a slurry fluid containing solid components.

2. Description of the Prior Art

A heat exchanger, wherein heat exchange is carried out to a heating medium, has been conventionally employed as a means for heating a fluid to be heat.

A High Pressure Acid Leach using an autoclave, for example, has been employed as one of the wet process for smelting of an oxide ore containing nonferrous metals such as nickel and cobalt. In the above High Pressure Acid Leach, the above oxide ore is prepared firstly into particles of a mean diameter of 2 mm or less in a crushing step and a sieving step and then prepared into an ore slurry of a specified concentration of solid components in a slurry-production step. The above ore slurry is then charged to a leaching step and subjected to leaching treatment under leaching conditions such as temperature and pressure selected as necessary. Subsequently, the leachate separated from a leached residue is subjected to removal of impurity elements and then to recovery of the objective metals such as nickel and cobalt.

In order to keep the leaching ratio high in the above leaching step, a temperature of about 200 to 300° C. is usually selected as the leaching condition in an autoclave. On the other hand, because the ore slurry produced in the previous step is usually prepared under a temperature condition of around outdoor temperature, the ore slurry not only lowers the temperature in the autoclave but also makes stable leaching reaction difficult when it is charged to the autoclave as it is. It is necessary, therefore, to make stepwise the temperature of the ore slurry close to temperature in the autoclave by preheating the ore slurry. In this time, when the ore slurry is simply heated in order to raise stepwise the temperature of ore slurry, the fluidity of ore slurry deteriorates as the water in the ore slurry evaporates, resulting in insufficient leaching reaction in the autoclave. Consequently, a device for preheating an ore slurry in actual operation of the above High Pressure Acid Leach is required to heat so as to keep the water content of ore slurry in good condition in order to suppress the fluidity deterioration of ore slurry.

Incidentally, various methods have been conventionally disclosed as a device for heating high-efficiently and stably a material such as a slurry. Examples include a horizontal rotary device equipped with a cylindrical vessel having the double side walls and many ejecting holes, in order to rotate the cylindrical vessel horizontally and eject a gas such as steam for heating into the vessel (for example, see Patent Literature 1) and a multi tube circular tube heat exchanger for heating a coal-water slurry, wherein the heat exchanger is installed so that the heat exchanging tube bundles become vertical direction, and the coal-water slurry flows downward in the heat exchanger tubes, and also a heat source fluid flows outside the relevant heat exchanger tubes (for example, see Patent Literature 2). These devices, however, usually have a problem that mechanical failures of the driving unit occur frequently or that indirect heating makes the structure of the device complicated, and thus are not always suitable as the heating method that satisfies the condition for heating while keeping its water content of ore slurry in good condition as described above, in a smelting plant where a large amount of ore material is treated, like the above wet process of smelting. By this reason, a countercurrent direct-heating-type heat exchanger, which has a simpler structure where steam is used as the heating medium, and the heating medium and the fluid to be heated flow counter-currently and are subjected to direct contact, has been employed.

The above countercurrent direct-heating-type heat exchanger is usually a type that heat exchange is carried out, while making a fluid to be heated inflow from its top and outflow from its bottom, and at the same time, making a heating medium inflow from its bottom and outflow from its top. In order to improve the contact between the fluid to be heated and the heating medium and thus to attain efficient heat exchange, the inside of main body of the above heat exchanger is equipped with umbrella-type dispersing plates for improving the dispersibility of the fluid to be heated flowing downward at its center and ring-like straightening plates for straightening the flow of the heating medium flowing upward on the side wall of the main body.

In operation of a countercurrent direct-heating-type heat exchanger in the actual operation the above High Pressure Acid Leach, an ore slurry is charged to the feed pipe installed horizontally at the top of the main body of the relevant heat exchanger and supplied to the apex part of the above umbrella-type dispersing plate from the feed nozzle which is connected with the relevant feed pipe and has an opening at the lower end in the vertical direction. The supplied ore slurry substantially forms a uniform stream flowing downward radially on the slope of the umbrella-type dispersing plate and is discharged from the bottom of the relevant heat exchanger. On the other hand, contrary to the ore slurry, steam is supplied from the bottom of the heat exchanger and forms a zigzag stream flowing upward by the above ring-type straightening plates and umbrella-type dispersing plates and is discharged from the steam outlet at the top of the heat exchanger.

The countercurrent direct-heating-type heat exchanger having such a structure is suitable as a preheating equipment in actual operation because direct contact of an ore slurry and steam flowing counter-currently makes it possible to heat the ore slurry while keeping its water content in good condition and also because the exchanger does not need the mechanical driving parts such as a motor or a pump and thus is free from troubles caused by the mechanical failures of the driving parts. Typical equipment trouble that occurs on a regular basis, however, includes an abrasion of each internal member due to the ore slurry. As for such an abrasion, as long as the flow of ore slurry forms substantially a uniform stream flowing downward radially on the slope of the umbrella-type dispersing plate, abrasion of the internal members such as the umbrella-type dispersing plates and the ring-type straightening plates develops uniformly as a whole and thus does not cause an unpredictable trouble such as degradation of the performance. That is, it is possible to confirm the degradation of such abrasion and performance in periodical inspections and then plan the renewal of equipment according to the plan.

However, there has been a problem that an ore slurry and steam begin to leak unexpectedly through a hole generated in the side wall of the main body of a countercurrent directheating-type heat exchanger or that local decrease in thickness of the relevant side wall is found in a large-scale periodical inspection accompanied by shutdown of operation to be conducted usually every half a year. It is considered that this phenomenon is caused by that the flow of the ore slurry supplied from the feed nozzle drifts to a specified direction on the umbrella-type dispersing plate and hits intensively a the side wall on specified part which is located on the extension line from the top face of the umbrella-type dispersing plate. The above situation, especially the outbreak of unexpected leak, requires great cost and time for repairing the relevant damaged part and causes not only the shutdown of the preheating step but also substantial reduction of the plant utilization rate in the whole operation of smelting. In addition, when the ore slurry drifts, the contact area between the ore slurry and steam becomes smaller than the area when the ore slurry forms a uniform stream flowing downward radially on the slope of the umbrella-type dispersing plate, which results in reduced efficiency of heat exchange and increased operation cost.

As described above, in a countercurrent direct-heating-type heat exchanger, technology for suppressing the drift of a fluid to be heated has been required from the standpoints of the life of equipment, and the efficiency of heat exchange with a heating medium and further the efficiency of the whole operation of smelting.

[Patent Literature 1] JP-A-6-238160 (page 1, page 2)
[Patent Literature 2] JP-A-5-26429 (page 1, page 2)

SUMMARY OF THE INVENTION

Considering the above problem of conventional technologies, it is an object of the present invention to provide a countercurrent direct-heating-type heat exchanger that is able to suppress the drift in the case when a fluid to be heated is supplied, to prevent local abrasion of the members and also to carry out efficient heat exchange, wherein heat exchange is carried out, while making a fluid to be heated inflow from its top and outflow from its bottom, and at the same time, making a heating medium inflow from its bottom and outflow from its top.

The present inventors have found, after having intensively studied the above countercurrent direct-heating-type heat exchanger to attain the above object, that a feed nozzle having a specific shape and dimension and further an umbrella-type dispersing plate equipped with impingement projections and a weir having a specific shape on the top face, can suppress the drift when a fluid to be heated is supplied, and can control a uniform stream flowing downward radially on the slope of the umbrella-type dispersing plate and thus can prevent local abrasion of the members and also can carry out efficient heat exchange, and have completed the present invention.

That is, according to the first aspect of the present invention, there is provided a countercurrent direct-heating-type heat exchanger wherein, heat exchange is carried out, while making a fluid to be heated inflow from its top into an upright nearly-cylindrical vessel equipped internally with parts including the following (A) to (D), and making the fluid outflow from its bottom, and at the same time, making a heating medium inflow from its bottom and making the medium outflow from its top:

(A) a feed pipe for the above fluid to be heated located at the diameter of the horizontal cross section at the top of the above nearly cylindrical vessel,
(B) a feed nozzle for the above fluid to be heated having an opening at its bottom end in the vertical direction which is connected with the above feed pipe at the center of the above horizontal cross section,
(C) a plurality of ring-like straightening plates located on the circumference of the inner surface of the side wall of the above nearly cylindrical vessel, and
(D) a plurality of umbrella-type dispersing plates having a nearly cone shape installed so that the dispersing plates are located alternately with the above ring-like straightening plates in the vertical direction of the above nearly cylindrical vessel and the apex of the cone coincides with the center of the above horizontal cross section; and
the countercurrent direct-heating-type heat exchanger is characterized in that the above feed nozzle has a shape of a pipe having a circular cross section and its dimension satisfies the following formula (1) and formula (2):

$$Ln/Dn \geq 1 \qquad \text{Formula (1)}$$

(wherein, Ln indicates the length of the feed nozzle; and Dn indicates the inside diameter of the feed nozzle)

$$1.5 \leq Sp/Sn \leq 2.0 \qquad \text{Formula (2)}$$

(wherein, Sp indicates the inner cross-sectional area of the feed pipe; and Sn indicates the inner cross-sectional area of the feed nozzle).

In addition, according to the second aspect of the present invention, there is provided the countercurrent direct-heating-type heat exchanger characterized in that the above feed nozzle has a double pipe structure having its center part closed and its circumference opened at its cross section of the opening, in the first aspect of the invention.

In addition, according to the third aspect of the present invention, there is provided the countercurrent direct-heating-type heat exchanger characterized in that furthermore a storing chamber for the above fluid to be heated is installed between the above feed pipe and feed nozzle, in the first or second aspect of the invention.

In addition, according to the fourth aspect of the present invention, there is provided the countercurrent direct-heating-type heat exchanger characterized in that the volume of the above storing chamber for the fluid to be heated satisfies the following formula (4):

$$8 \times (Dp)^3 \leq V \leq 27 \times (Dp)^3 \qquad \text{Formula (4)}$$

(wherein, V indicates the volume of the storing chamber; and Dp indicates the inside diameter of the feed pipe), in the third aspect of the invention.

In addition, according to the fifth aspect of the present invention, there is provided the countercurrent direct-heating-type heat exchanger characterized in that the distance between the bottom end of the above feed nozzle and the apex of the above umbrella-type dispersing plate satisfies the following formula (3):

$$\frac{1}{2} \times Dn \leq X \leq Dn \qquad \text{Formula (3)}$$

(wherein, X indicates the distance between the bottom end of the feed nozzle and the apex of the umbrella-type dispersing plate; and Dn indicates the inside diameter of the feed nozzle), in any one of the first to the fourth aspects of the invention.

In addition, according to the sixth aspect of the present invention, there is provided the countercurrent direct-heating-type heat exchanger characterized in that, in the above umbrella-type dispersing plate, a plurality of impingement projections satisfying the following requirement (1) are installed radially on its top face, and a weir satisfying the following requirement (2) is installed at the periphery on its top face.

Requirement (1): The shape of impingement protrusion is a rectangular parallelepiped having a square bottom face and has the dimension to satisfy the following formula (5) and formula (6):

$$\tfrac{1}{50} \times \Phi \leq W \leq \tfrac{1}{25} \times \Phi \quad \text{(Formula 5)}$$

(wherein, W indicates the length of the base of the rectangular parallelepiped; and Φ indicates the outside diameter of the cone shape bottom of the umbrella-type dispersing plate), $$t \geq \tfrac{1}{5} \times W \quad \text{Formula (6)}$$

(wherein, t indicates the height (thickness) of the rectangular parallelepiped; and W indicates the length of the base of the rectangular parallelepiped), Requirement (2): The height of the weir satisfies the following formula (7) that is represented in mm unit.

$$25 \leq h \leq H \quad \text{Formula (7)}$$

(wherein, h indicates the height of the weir; and H indicates the vertical distance (height) from the cone shape apex to the bottom of the umbrella-type dispersing plate), in any one of the first to the fifth aspects of the invention.

In addition, according to the seventh aspect of the present invention, there is provided the countercurrent direct-heating-type heat exchanger using as a preheating equipment of an ore slurry in a wet process for smelting of nickel oxide ore using a High Pressure Acid Leach, characterized in that the above fluid to be heated is a slurry of nickel oxide ore and the above heating medium is steam, in any one of the first to the sixth aspects of the invention.

According to the eighth aspect of the present invention, there is provided the countercurrent direct-heating-type heat exchanger characterized in that the inner cross-sectional area (Sn) of the above feed nozzle has a cross-sectional area corresponding to the inside diameter (Dn) of the feed nozzle which is 25 mm or more, in the seventh aspect of the invention.

The countercurrent direct-heating-type heat exchanger of the present invention solves the problems of conventional countercurrent direct-heating-type heat exchangers in a countercurrent direct-heating-type heat exchanger wherein heat exchange is carried out, while making a fluid to be heated inflow from its top and outflow from its bottom, and at the same time, making a heating medium inflow from its bottom and outflow from its top, and is able to suppress the drift in the case when a fluid to be heated is supplied, to prevent local abrasion of the members and also to carry out efficient heat exchange, and therefore, is very valuable in industries.

NOTATION

1 Feed pipe
2 Feed nozzle
3 Ring-like straightening plate
4 Umbrella-type dispersing plate
5 Nearly cylindrical vessel
6 Storing chamber
7 Fluid to be heated
8 Heating medium
9 Impingement protrusion
10 Weir

DETAILED DESCRIPTIONS OF THE INVENTION

Figure 1:
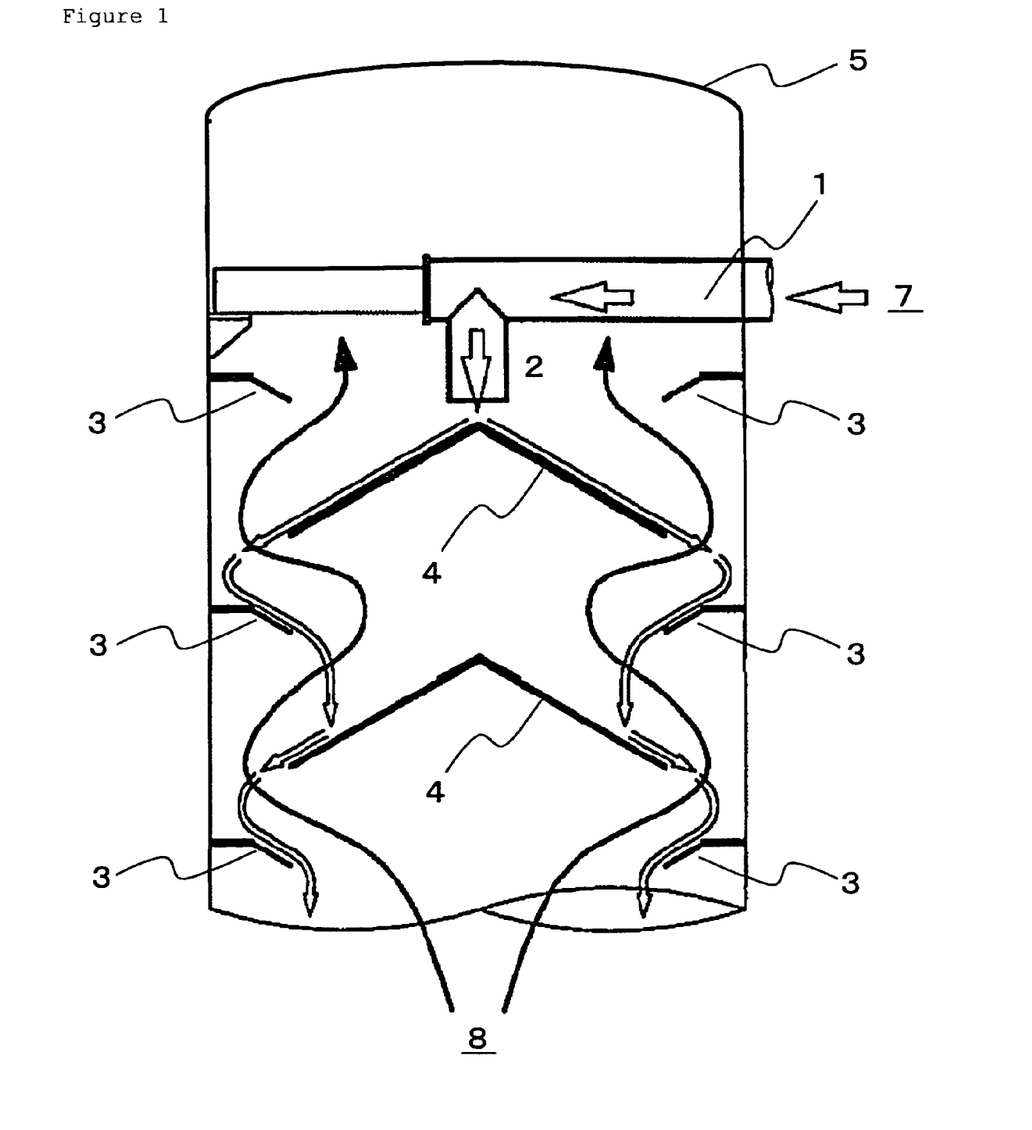
FIG. 1 is a schematic view showing one example of the vertical cross section of the countercurrent direct-heating-type heat exchanger of the present invention

The countercurrent direct-heating-type heat exchanger of the present invention is described in detail, hereinafter. As shown in FIG. 1, the countercurrent direct-heating-type heat exchanger of the present invention is a countercurrent direct-heating-type heat exchanger wherein, heat exchange is carried out, while making a fluid to be heated inflow from its top into an upright nearly-cylindrical vessel and making the fluid outflow from its bottom, and at the same time, making a heating medium inflow from its bottom and making the medium outflow from its top, as described specifically in later examples, a feed nozzle having a specific shape and dimension and further an umbrella-type dispersing plate equipped with impingement projections and a weir having a specific shape on the top face, can suppress the drift when a fluid to be heated is supplied, and can control a uniform stream flowing downward radially on the slope of the umbrella-type dispersing plate and thus can prevent local abrasion of the members and also can carry out efficient heat exchange, in contrast to a conventional unimproved feed nozzle and umbrella-type dispersing plate.

FIG. 1 is a schematic view showing one example of vertical cross section of the countercurrent direct-heating-type heat exchanger of the present invention. In FIG. 1, the upright nearly-cylindrical vessel 5 is equipped internally with parts consisting of the following (A) to (D)

(A) a feed pipe 1 located at the diameter of the horizontal cross section at the top of the above nearly cylindrical vessel 5, (B) a feed nozzle 2 having an opening at its bottom end in the vertical direction which is connected with the above feed pipe 1 at the center of the above horizontal cross section, (C) a plurality of ring-like straightening plates 3 located on the circumference of the inner surface of the side wall of the above nearly cylindrical vessel 5, and (D) a plurality of umbrella-type dispersing plates 4 having a nearly cone shape installed so that the dispersing plates are located alternately with the above ring-like straightening plates 3 in the vertical direction of the above nearly cylindrical vessel 5 and the apex of the cone coincides with the center of the above horizontal cross section, that is, is located right under the opening of the above feed nozzle.

Here, in the operation of the above countercurrent direct-heating-type heat exchanger, a fluid to be heated 7 is charged to the feed pipe 1 from the outside of the relevant heat exchanger and supplied to the inside of the relevant heat exchanger from the feed nozzle 2. The fluid to be heated 7 supplied to the inside of the above heat exchanger forms substantially a uniform stream flowing downward radially on the slope of the umbrella-type dispersing plates 4 by the umbrella-type dispersing plates 4 and the ring-like straightening plates 3 and is discharged from the bottom (not shown)

of the relevant heat exchanger. On the other hand, contrary to the fluid to be heated 7, a heating medium 8 is supplied from the bottom of the heat exchanger and forms a approximately zigzag stream flowing upward by the umbrella-type dispersing plates 4 and ring-like straightening plates 3 and is discharged from the steam outlet (not shown) at the top of the heat exchanger to the outside of the vessel.

The above fluid to be heated is not particularly limited, but includes various fluids that contain a material to be heated and have fluidity, for example, a slurry fluidity liquid that contains solid components, among these, an ore slurry transferred from the slurry production step is preferably used in the following [wet process for smelting nickel oxide ore using a High Pressure Acid Leach]. That is, the above countercurrent direct-heating-type heat exchanger is used as a preheating equipment for preheating step of an ore slurry transferred from the slurry production step.

[Wet Process for Smelting Nickel Oxide Ore Using a High Pressure Acid Leach]

Slurry production step: Nickel oxide ore is prepared to particles of a mean diameter of 2 mm or less by crushing step and sieving step and then thickened by removing an extra water in the slurry by using a solid/liquid separator such as a thickener to prepare an ore slurry containing the solid components of a specified concentration in the slurry production step.

Preheating step: The ore slurry transferred from the slurry production step is preheated.

Leaching step: The ore slurry transferred from the preheating step is added with sulfuric acid and leached while blowing a high-pressure air and high-pressure steam to obtain a leachate including nickel and cobalt.

Sulfurization step: The leachate obtained in the leaching step is subjected to sulfurization and precipitation method to obtain a mixed sulfide of nickel/cobalt.

The nickel oxide ore to be used in the above wet smelting process is mainly so-called lateritic ore such as limonite ore and saprolite ore. Nickel content in the above lateritic ore is usually 0.5 to 3.0% by mass, and is contained as a hydroxide or a silicic bittern (magnesium silicate) mineral. Iron content is 10 to 50% by mass, and has a form of mainly a trivalent hydroxide (goethite, FeOOH), however, a part of divalent iron is contained in the silicic bittern mineral.

The concentration of the ore slurry produced in the above slurry production step is not particularly limited because it depends largely on the properties of the nickel oxide ore to be treated, but the slurry concentration of the slurry to be leached is preferably high and usually adjusted so as to be 20 to 50% by mass. That is, the slurry concentration lower than 20% by mass of the slurry to be leached requires a large facility to obtain a same residence time in the leaching and an acid amount to be added increases to control the residual acid concentration. In addition, the obtained leachate has a lower concentration of nickel. On the other hand, the slurry concentration higher than 50% by mass of the slurry to be leached makes the viscosity of slurry high and causes a problem of difficult transfer (frequent clogging of pipe, high energy requirement), while it requires smaller facility.

When a countercurrent direct-heating-type heat exchanger is used as a preheating equipment in the above preheating step, steam is used as the heating medium in order to keep the water content in the ore slurry appropriate. The steam to be used in the preheating step may use the steam generated in a general method such as a boiler or steam, which is generated when the object to be heated discharged from an autoclave after leaching in the autoclave is depressurized stepwise in a depressurizing tank, is recovered and may be used with circulation.

EXAMPLES

Hereinafter, the examples of the present invention are described more specifically with reference to drawings. The present invention, however, is not limited to these examples.

Example 1

The first embodiment of the present invention is a countercurrent direct-heating-type heat exchanger wherein, heat exchange is carried out, while making a fluid to be heated 7 inflow from its top into an upright nearly-cylindrical vessel 5 equipped internally with parts including the following (A) to (D), and making the fluid outflow from its bottom, and at the same time, making a heating medium 8 inflow from its bottom and making the medium outflow from its top:

(A) a feed pipe for the above fluid to be heated located at the diameter of the horizontal cross section at the top of the above nearly cylindrical vessel 5, (B) a feed nozzle 2 for the above fluid to be heated 7 having an opening at its bottom end in the vertical direction which is connected with the above feed pipe 1 at the center of the above horizontal cross section, (C) a plurality of ring-like straightening plates 3 located on the circumference of the inner surface of the side wall of the above nearly cylindrical vessel 5, and (D) a plurality of umbrella-type dispersing plates 4 having a nearly cone shape installed so that the dispersing plates are located alternately with the above ring-like straightening plates 3 in the vertical direction of the above nearly cylindrical vessel 5 and the apex of the cone coincides with the center of the above horizontal cross section; and the countercurrent direct-heating-type heat exchanger is characterized in that the above feed nozzle 2 has a shape of a pipe having a circular cross section and its dimension satisfies the following formula (1) and formula (2):

$$Ln/Dn \geq 1 \quad \text{Formula (1)}$$

(wherein, Ln indicates the length of the feed nozzle; and Dn indicates the inside diameter of the feed nozzle)

$$1.5 \leq Sp/Sn \leq 2.0 \quad \text{Formula (2)}$$

(wherein, Sp indicates the inner cross-sectional area of the feed pipe; and Sn indicates the inner cross-sectional area of the feed nozzle).

Provided that, the inner cross-sectional area means a cross-sectional area of the opening calculated from the inside diameter of the pipe.

The first embodiment, by satisfying the above formula (1) and formula (2) in the first embodiment, is able to suppress the drift in the case when a fluid to be heated is supplied, and can control a uniform stream flowing downward radially on the slope of the umbrella-type dispersing plate and thus can prevent local abrasion of the members and also to carry out efficient heat exchange.

That is, the above feed nozzle serves to change the direction of flow of a fluid to be heated in-flowed from the outside of the heat exchanger from the horizontal direction to the vertical direction through feed pipe, when the condition of the above formula (1) is satisfied, the fluid to be heated collide against the side wall of feed nozzle having a sufficient height and most components in the horizontal vector of the flow of the fluid to be heated are lost. In addition, when the condition of the above formula (2) is satisfied, the amount of the fluid to be heated moving from the feed pipe to the feed nozzle is restricted and the pushing pressure, which heads for the direction of the feed nozzle having an opening at the bottom end of the vertical direction, works. The flow of fluid to be heated, therefore, flows downward in the vertical direction and is supplied to the apex of the umbrella-type dispersing plate. Consequently, the fluid to be heated flows downward radially and uniformly on the slope of the umbrella-type dispersing plate.

In the first embodiment, the distance (X) between the bottom end of the feed nozzle 2 and the apex of the umbrella-type dispersing plate 4 is not particularly limited, but preferably satisfies the following formula (3):

$$\tfrac{1}{2} \times Dn \leq X \leq Dn \qquad \text{Formula (3)}$$

(wherein, X indicates the distance between the bottom end of the feed nozzle and the apex of the umbrella-type dispersing plate; Dn indicates the inside diameter of the feed nozzle). That is, too short distance (X) between the bottom end of the feed nozzle 2 and the apex of the umbrella-type dispersing plate 4 has a possibility to cause clogging at this part and abrasion of the umbrella-type dispersing plate 4. Here, the distance between the bottom end of the feed nozzle and the apex of the umbrella-type dispersing plate is preferably set to be ½ of Dn or more. On the other hand, when X is too large, the heating medium coming up exerts influence and therefore the distance is preferably set to be about the same as Dn or less.

Here, when an ore slurry of oxide ore containing nonferrous metal such as nickel and cobalt is preheated in the first embodiment, the inner cross-sectional area (Sn) of the feed nozzle is desirably provided with larger size than the predetermined value in order to prevent the clogging due to the ore slurry, considering the properties of the ore slurry. For example, when the horizontal cross section of feed nozzle is a simple circle, the inner cross-sectional area (Sn) of feed nozzle has desirably a cross-sectional area corresponding to the inside diameter (Dn) of the feed nozzle having 25 mm or more.

In addition, the upper limit of Ln/Dn is not specified in formula (1), but if the distance (Y) between the lower end of the feed pipe and the apex of the umbrella-type dispersing plate is decided, the upper limit of Ln/Dn is fixed automatically to satisfy formulae (2) and (3), and thus the upper limit of Ln/Dn is specified. For example, if it is Y=2.0×Dn, the upper limit of Ln/Dn is about 1.5.

As explained above, the upper limit of Ln/Dn can not be specified because it varies depending on the value of above Y, however, because the maximum value of Y is usually about 3 times as large as Dn, Ln/Dn is specified as Ln/Dn≦2.5 even in maximum case.

Example 2

Figure 2:
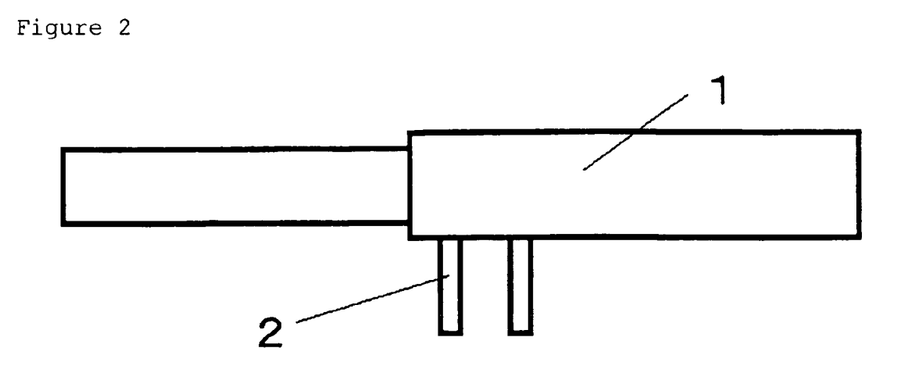
FIG. 2 is a schematic view of a feed nozzle having a double pipe structure showing one example of the feed nozzle of the present invention

The second embodiment of the present invention is characterized in that the feed nozzle 2 has a double pipe structure having the closed center part and opened circumference in its open cross section in the above first embodiment, as shown in FIG. 2. FIG. 2 is a schematic view of a feed nozzle having a double pipe structure representing one example of the feed nozzle of the present invention.

That is, the flow rate of a fluid to be heated flowing inside a pipe becomes generally large at the center of the cross section of the pipe having a circular cross section. Therefore, the fluid to be heated to be supplied to the apex of the umbrella-type dispersing plate is supplied as a nearly cylindrical stream by the feed nozzle 2 having a double pipe structure and the apex of the umbrella-type dispersing plate 4 is located nearly at the center of the cylindrical stream. Consequently, the fluid to be heated is supplied by more uniform flow rate than in the above first embodiment.

Here, it is essential that the dimension of the feed nozzle 2 having a double pipe structure satisfies the above formula (1) and formula (2). In addition, it is preferable that the outside diameter of the feed nozzle 2 does not exceed the outside diameter of the feed pipe 1. On the other hand, the diameter of the closed part at the center of the feed nozzle 2 is not particularly limited, as long as the relation of the inner cross-sectional areas shown in the above formula (2) is satisfied.

Example 3

Figure 3:
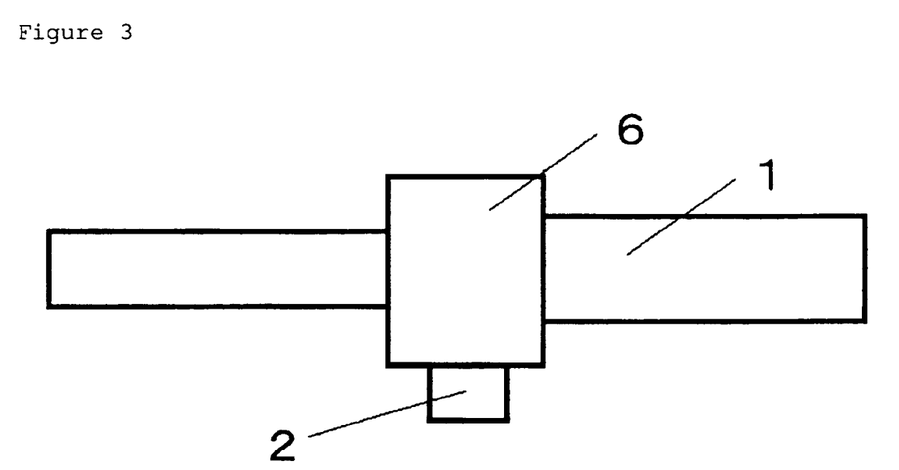
FIG. 3 is a schematic view of a feed nozzle having a storing chamber of a fluid to be heated showing one example of the feed nozzle of the present invention

The third embodiment of the present invention is characterized in that a storing chamber 6 of a fluid to be heated is installed between the above feed pipe 1 and feed nozzle 2 in the above first embodiment, as shown in FIG. 3. FIG. 3 is a schematic view of a feed nozzle having a storing chamber of a fluid to be heated representing one example of the feed nozzle of the present invention.

That is, the stream of a fluid to be heated generally tends to become turbulent at the bend of piping, resulting in an uneven flow rate. Therefore, the storing chamber 6 installed at the connecting part of the feed pipe 1 and the feed nozzle 2 can prevent the stream of the fluid to be heated in the feed pipe 1 from flowing directly into the feed nozzle 2 and from becoming turbulent, consequently, the fluid to be heated is supplied to the umbrella-type dispersing plate at the more uniform flow rate than in the above first embodiment.

Here, the volume of the storing chamber is not particularly limited, but it is preferable to satisfy the following formula (4):

$$8 \times (Dp)^3 \leq V \leq 27 \times (Dp)^3 \qquad \text{Formula (4)}$$

(wherein, V indicates the volume of the storing chamber; and Dp indicates the inside diameter of the feed pipe).

That is, a larger volume of the storing chamber is preferable just for prevention of turbulent flow, but the upper limit of the volume is preferable to set approximately a volume corresponding to a rectangular hexahedron having as a side a length of 3 times as large as the inside diameter of the feed pipe in order not to impose an extra load on the supporting strength of the feed pipe. On the other hand, a too small volume has not sufficient effect on prevention of turbulent flow and therefore the lower limit of the volume is preferably to set a volume corresponding to a rectangular hexahedron having as a side a length of 2 times as large as the inside diameter of the feed pipe.

Incidentally, a fluid to be heated is supplied to the apex of the umbrella-type dispersing plate under the condition that the above formulae (1) and (2) are satisfied, in the first embodiment, however, because the cross-sectional area of the feed nozzle is smaller than that of the feed pipe, the flow rate of the fluid to be heated supplied from the feed nozzle is larger compared with that of the fluid to be heated charged to the feed pipe. In addition, because the fluid to be heated supplied to the apex of the umbrella-type dispersing plate is supplied as a nearly cylindrical stream in the second embodiment and the stream of the fluid to be heated in the feed pipe is prevented from flowing directly into the feed nozzle and from generating turbulence in the third embodiment, the fluid to be heated is supplied at a more uniform flow rate than in the first embodiment. A breakage caused by local abrasion at the inner surface of the side wall, therefore, can be suppressed.

However, even if a fluid to be heated is supplied to the apex of the umbrella-type dispersing plate and flows downward radially and uniformly on the slope of the umbrella-type dispersing plate, the fluid to be heated having a high flow rate will hit the whole circumferential area of the inner surface of the side wall if the flow rate of the fluid to be heated is too high. In addition, there will be a risk that the high flow rate causes insufficient efficiency of heat exchange. By this reason, it is desirable to take a measure to reduce the flow rate of the fluid to be heated flowing downward on the slope of the umbrella-type dispersing plate.

Example 4

Figure 4:
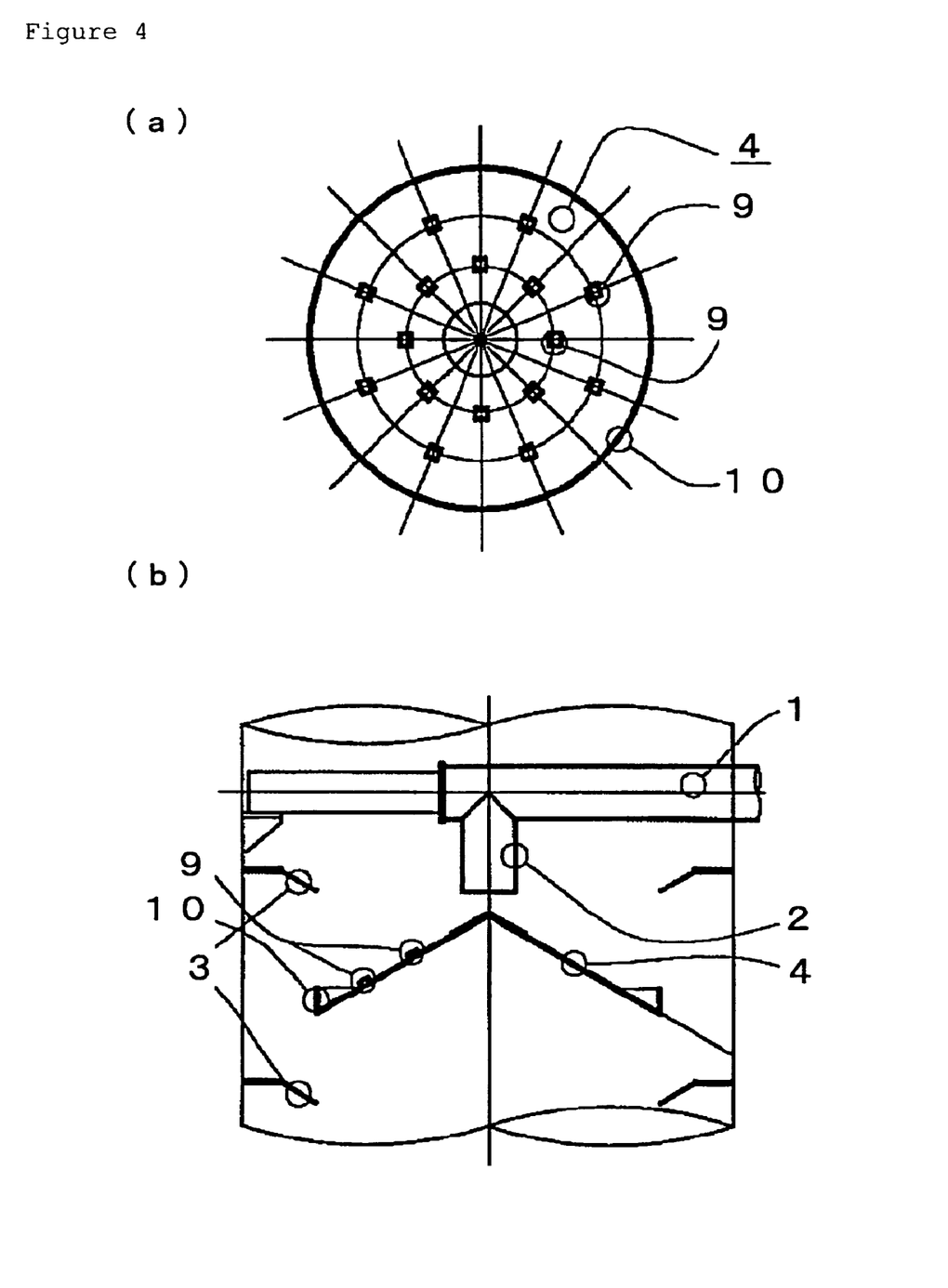
FIG. 4 is a schematic view showing one example of the top face (a) and the vertical cross section (b) of the umbrella-type dispersing plate of the present invention which has a plurality of impingement projections installed radially on its top face and a weir installed at the periphery on its top face

The fourth embodiment of the present invention is characterized in that the umbrella-type dispersing plate 4 has a plurality of impingement projections 9 satisfying the following requirement (1) and are installed radially on its top face and a weir 10 satisfying the following requirement (2) and is installed at the periphery on its top face in the above first embodiment, as shown in FIGS. 4(*a*) and(*b*):

Requirement (1): The shape of impingement protrusion 9 is a rectangular parallelepiped having a square bottom face and has the dimension to satisfy the following formula (5) and formula (6):

$$1/50 \times \Phi \leq W \leq 1/25 \times \Phi \quad \text{Formula (5)}$$

(wherein, W indicates the length of the base of the rectangular parallelepiped; and $\Phi$ indicates the outside diameter of the cone shape bottom of the umbrella-type dispersing plate), $$t \geq 1/5 \times W \quad \text{Formula (6)}$$

(wherein, t indicates the height (thickness) of the rectangular parallelepiped; and W indicates the length of the base of the rectangular parallelepiped), Requirement (2): The height of the weir satisfies the following formula (7) that is represented in mm unit.

$$25 \leq h \leq H \quad \text{Formula (7)}$$

(wherein, h indicates the height of the weir; and H indicates the vertical distance (height) from the cone shape apex to the bottom of the umbrella-type dispersing plate).

Here, FIGS. 4(*a*) and (*b*) are a schematic view showing an example of the top face (a) and the vertical cross section (b) of the umbrella-type dispersing plate having a plurality of impingement projections installed on its top face and a weir installed at the periphery on its top face.

An impingement projections having a shape of a rectangular parallelepiped with a square bottom face which satisfy the above formula (5) and formula (6) are installed on the top face of the umbrella-type dispersing plate and a weir which satisfies the above formula (7) is installed at the periphery on the top face of the umbrella-type dispersing plate, reduce the flow rate of a fluid to be heated at which the fluid to be heated flows downward on the slope of the umbrella-type dispersing plate and thus greatly suppress abrasion of the inner surface of the side wall preventing an equipment breakage.

That is, a plurality of impingement projections 9 which fulfill the above requirement (1) and are installed radially on the radial lines from the apex on the top face of the umbrella-type dispersing plate 4 as shown in FIG. 4(*a*), reduce the flow rate of a fluid to be heated supplied to the apex of the umbrella-type dispersing plate 4 and improve its dispersion and thus can enhance efficiency of heat exchange. It should be noted that the number and location of the installed impingement projections 9 are not particularly limited, but are selected so that the flow rate of the fluid to be heated is reduced sufficiently.

Here, the shape of the impingement protrusion 9 is a rectangular parallelepiped with a square bottom face and it is important for its dimension to fulfill the condition of formula (5) and formula (6). That is, the square bottom face of the impingement protrusion 9 can save time and labor for machining the impingement protrusion and for installing it on the umbrella-type dispersing plate. On the other hand, a thickness of 1/5 of the length (W) or more of the bottom face of the rectangular parallelepiped can give sufficient reduction affect of the flow rate. Too much thickness, however, does not give extra effect, but may cause other problem such as clogging, therefore, its upper limit is the distance (X) between the lower end of the feed nozzle and the apex of the umbrella-type dispersing plate.

In addition, as shown in FIG. 4(*b*), a weir 10, which fulfills the above requirement (2) and is installed at the periphery on the top face of the umbrella-type dispersing plate 4, exerts a similar effect to the impingement protrusion 9 and also can prevent the side wall from damage due to crater by reducing the flow rate of a fluid to be heated and easing its collision with the side wall even when the drift will happen. Here, it is important for the weir height to fulfill the condition of formula (7). That is, a weir having a height of 25 mm or more can reduce the flow rate of a fluid to be heated and ease its collision with the side wall. On the other hand, a too high weir has a possibility to touch the feed pipe or a ring-like straightening plate and to cause another problem such as clogging, therefore, its upper limit is preferably the height (H) of the umbrella-type dispersing plate or less.

The material of the above impingement protrusion and weir should be strong against damage from the flow of a fluid to be heated and is preferably the same as the material of the umbrella-type dispersing plate in view of welding.

In the above fourth embodiment, the drift of the fluid to be heated is suppressed and also the flow of the fluid to be heated can keep appropriate flow rate, when the fluid to be heated is supplied to the apex of the umbrella-type dispersing plate and flows downward radially on the slope of the umbrella-type dispersing plate, therefore, great improvement can be attained compared with a countercurrent direct-heating-type heat exchanger equipped with a conventional unimproved feed nozzle and umbrella-type dispersing plate from the standpoints of equipment life, heat exchange and efficiency of whole operation.

The effect of the countercurrent direct-heating-type heat exchanger of the above fourth embodiment in the case employed in the preheating step for the ore slurry in the above [wet process for smelting nickel oxide ore using a High Pressure Acid Leach] is described using the specific examples. The specification of equipment and the condition of operation are as follows.

(a) Main body of the countercurrent direct-heating-type heat exchanger: A cylindrical vessel having a shell diameter of 2,000 mm and a height of 7,000 mm is used. The material of the side wall is clad steel of titanium having a thickness of 9 mm for its inner surface and carbon steel having a thickness of 23.5 mm for its outer surface.

(b) Feed pipe: The inside diameter is 187 mm.

(c) Feed nozzle: The inside diameter (Dn) is 151 mm. A pipe having a circular cross section and a length (Ln) of 300 mm is used. The feed nozzle was located so that the center of its horizontal cross section was on the vertical line passing the apex of the umbrella-type dispersing plate. Ln/Dn was 2.0 and Sp/Sn is 1.5.

(d) Umbrella-type dispersing plate: The outside diameter is 1,400 mm and the height is 390 mm. Impingement projections and a weir were installed on its top face. The impingement projections are installed radially as shown in FIG. 4(a). The impingement projections have the bottom face of which a side is 50 mm in length. Its height is 20 mm. The weir is shown in FIG. 4(b) and its height is 100 mm.

(e) Feed rate of the slurry of nickel oxide ore to the feed pipe: The rate is 240 to 280 m³/h.

(f) Properties of the slurry of nickel oxide ore: These are shown in Table 1.

TABLE 1

| Solid content | % by mass | 20 to 40 |
|---|---|---|
| Particle diameter of solid content | mm | <2.0 |
| Ni | % by mass | 0.5 to 2.5 |
| Co | % by mass | 0.01 to 0.20 |
| Fe | % by mass | 20 to 50 |
| Si | % by mass | 3 to 15 |
| Mn | % by mass | 1 to 10 |
| pH | — | 3 to 6 |

After the operation of half a year under the above conditions, no local abrasion was found on the inner surface of the side wall of the heat exchanger. In addition, the amount of steam used as a heating medium was 0.0989 (ton/m³) on average during the operation period. It should be noted that the amount of steam used is the amount necessary for heating the ore slurry to a specified temperature and calculated as the amount of the steam used (ton/h) per the feed rate (m³/h) of the ore slurry.

Example 5

The fifth embodiment of the present invention is characterized in that the umbrella-type dispersing plate 4 has a plurality of impingement projections 9 which satisfy the above requirement (1) and are installed radially on its top face and a weir 10 which satisfies the above requirement (2) and is installed at the periphery on its top face as shown in FIGS. 4(a) and (b) in the above second embodiment.

The above fifth embodiment differs from the above fourth embodiment only in that the feed nozzle is changed to the feed nozzle having a double pipe structure, however, similarly as in the fourth embodiment, the drift of the fluid to be heated is suppressed and also the flow of the fluid to be heated can keep appropriate flow rate, when the fluid to be heated is supplied to the apex of the umbrella-type dispersing plate uniformly and flows downward radially on the slope of the umbrella-type dispersing plate, therefore, great improvement can be attained compared with a countercurrent direct-heating-type heat exchanger equipped with a conventional unimproved feed nozzle and umbrella-type dispersing plate from the standpoints of equipment life, heat exchange and efficiency of whole operation.

The effect of the countercurrent direct-heating-type heat exchanger of the above fifth embodiment in the case employed in the preheating step for the ore slurry in the above [wet process for smelting nickel oxide ore using a High Pressure Acid Leach] is described using the specific examples.

It should be noted that it was conducted similarly as in the specific example conducted using the countercurrent direct-heating-type heat exchanger of the above fourth embodiment except that the feed nozzle having a double pipe structure shown in FIG. 2 was used. It should be noted that the feed nozzle having a double pipe structure has an inside diameter of the opening of 179 mm and a diameter of central closed part of 93 mm. Sp/Sn, the ratio of the cross-sectional area of the feed nozzle (Sn) where the slurry can pass and the cross-sectional area of the feed pipe (Sp) was 1.5.

As a result, no local abrasion was found on the inner surface of the side wall of the heat exchanger. The amount of steam used as a heating medium was almost the same as that in the operation using the countercurrent direct-heating-type heat exchanger of the fourth embodiment.

Example 6

The sixth embodiment of the present invention is characterized in that the umbrella-type dispersing plate 4 has a plurality of impingement projections 9, which satisfy the above requirement (1), and are installed radially on its top face, and a weir 10, which satisfies the above requirement (2), and is installed at the periphery on its top face, in the above third embodiment as shown in FIGS. 4(a) and (b).

The above sixth embodiment differs from the above fourth embodiment only in that the feed nozzle is changed to the feed nozzle having a storing chamber of a fluid to be heated installed between the feed pipe and feed nozzle, however, similarly as in the fourth embodiment, the drift of the fluid to be heated is suppressed and also the flow of the fluid to be heated can keep appropriate flow rate, when the fluid to be heated is supplied to the apex of the umbrella-type dispersing plate uniformly and flows downward radially on the slope of the umbrella-type dispersing plate, therefore, great improvement can be attained compared with a countercurrent direct-heating-type heat exchanger equipped with a conventional unimproved feed nozzle and umbrella-type dispersing plate from the standpoints of equipment life, heat exchange and efficiency of whole operation.

The effect of the countercurrent direct-heating-type heat exchanger of the above sixth embodiment in the case employed in the preheating step for the ore slurry in the above [wet process for smelting nickel oxide ore using a High Pressure Acid Leach] is described using the specific examples.

It should be noted that it was conducted similarly as in the specific example conducted using the countercurrent direct-heating-type heat exchanger of the above fourth embodiment except that a storing chamber of the fluid to be heated is installed between the feed pipe and feed nozzle as shown in FIG. 3. It should be noted that the feed nozzle has an inside diameter of 151 mm. Sp/Sn, the ratio of the cross-sectional area of the feed nozzle (Sn) and the cross-sectional area of the feed pipe (Sp) is 1.5. The width, length and height of the storing chamber are 2 times, 2 times and 3 times as large as the inside diameter (Dp) of the feed pipe respectively. The volume (V) of the storing chamber is $12 \times (Dp)^3$.

As a result, no local abrasion was found on the inner surface of the side wall of the heat exchanger. It should be noted that the amount of steam used as a heating medium was almost the same as that in the operation using the countercurrent direct-heating-type heat exchanger of the fourth embodiment.

Comparative Example 1

Figure 5:
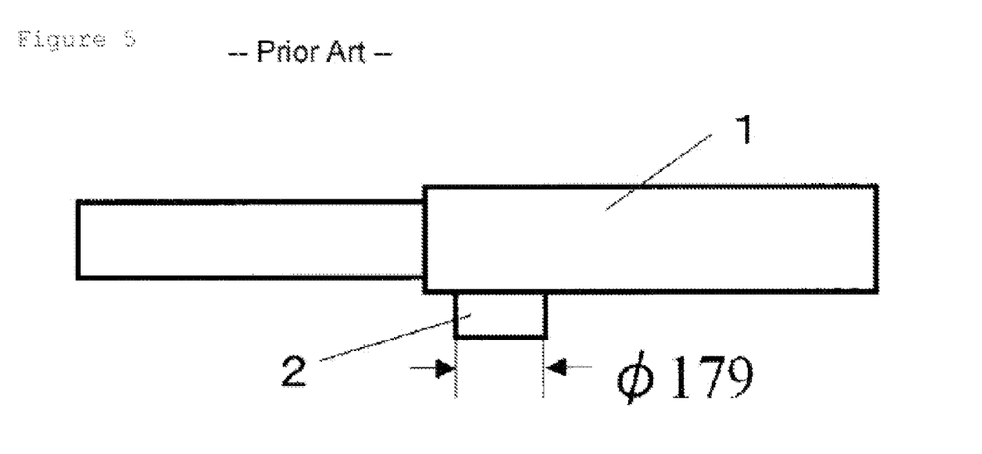
FIG. 5 is a schematic view showing one example of a feed nozzle having a conventional shape used in Comparative Example 1

The case where the countercurrent direct-heating-type heat exchanger equipped with the feed nozzle 2 of a conventional shape shown in FIG. 5 and the umbrella-type dispersing plate having no impingement projections nor weir installed was employed in the preheating step for the ore slurry in the above [wet process for smelting nickel oxide ore using a High Pressure Acid Leach] is described as a comparative example.

Here, it is similar as in the specific example conducted using the countercurrent direct-heating-type heat exchanger of the above fourth embodiment except that the dimension of the feed nozzle was different and that the umbrella-type dispersing plate having no impingement projections nor weir installed was used. It should be noted that the feed nozzle of the comparative example is an inside diameter of 179 mm. Sp/Sn, the ratio of the cross-sectional area of the feed nozzle (Sn) and the cross-sectional area of the feed pipe (Sp) is 1.1. In addition, the length of the feed nozzle is 68 mm. Ln/Dn, the ratio of the inside diameter Dn and length Ln of the feed nozzle was 0.4.

It should be noted that, the operation was conducted for one year, and the regular inspection was conducted after half a year since the start. As a result, local abrasion was found at the inner surface of the side wall at the regular inspection after half year, after one-year, a hole opened at the relevant position, and steam leakage was generated. The amount of steam used as a heating medium was 0.1014 (ton/m$^3$) on average during the operation period.

As apparent from the above descriptions, in the first to sixth embodiments, it can be understood that local abrasion is suppressed in the aspect of equipment life and the amount of steam used is reduced, for example, by about 3% in the aspect of heat exchange and thus the efficiency of the whole operation is improved when the countercurrent direct-heating-type heat exchanger of the present invention was used, compared with when a countercurrent direct-heating-type heat exchanger equipped with a conventional unimproved feed nozzle and umbrella-type dispersing plate (Comparative Example 1) was used.

As apparent from the above, in a countercurrent direct-heating-type heat exchanger, wherein heat exchange is carried out, while making a fluid to be heated inflow from its top and outflow from its bottom, and at the same time, making a heating medium inflow from its bottom and outflow from its top, the countercurrent direct-heating-type heat exchanger of the present invention solves the problems of conventional countercurrent direct-heating-type heat exchangers, and is able to suppress drift of the fluid to be heated when it is supplied, to prevent local abrasion of the members and also to carry out efficient heat exchange, therefore, it is suitable as a preheating equipment of an ore slurry to be used in the above [wet process for smelting nickel oxide ore using a High Pressure Acid Leach]. It should be noted that it can be suitably used for heating not only the above ore slurry but also a general fluid to be heated.

What is claimed is:

1. A countercurrent direct-heating heat exchanger wherein, heat exchange is carried out, while making a fluid to be heated inflow from its top into an upright cylindrical vessel equipped internally with parts including the following (A) to (D), and making the fluid outflow from its bottom, and at the same time, making a heating medium inflow from its bottom and making the medium outflow from its top:

(A) a feed pipe for the above fluid to be heated located at the diameter of the horizontal cross section at the top of the above cylindrical vessel, (B) a feed nozzle for the above fluid to be heated having an opening at its bottom end in the vertical direction which is connected with the above feed pipe at the center of the above horizontal cross section, (C) a plurality of ring straightening plates located on the circumference of the inner surface of the side wall of the above cylindrical vessel, and (D) a plurality of umbrella dispersing plates having a cone shape installed so that the dispersing plates are located alternately with the above ring straightening plates in the vertical direction of the above cylindrical vessel and the apex of the cone coincides with the center of the above horizontal cross section; and the countercurrent direct-heating heat exchanger is characterized in that the above feed nozzle has a shape of a pipe having a circular cross section and its dimension satisfies the following formula (1) and formula (2):

$$Ln/Dn \geq 1 \qquad \text{Formula (1)}$$

(wherein, Ln indicates the length of the feed nozzle; and Dn indicates the inside diameter of the feed nozzle)

$$1.5 \leq Sp/Sn \leq 2.0 \qquad \text{Formula (2)}$$

(wherein, Sp indicates the inner cross-sectional area of the feed pipe; and Sn indicates the inner cross-sectional area of the feed nozzle); and characterized in that, in the above umbrella dispersing plate, a plurality of impingement projections satisfying the following requirement (1) are installed radially on its top face, and a weir satisfying the following requirement (2) is installed at the periphery on its top face:

Requirement (1): The shape of impingement protrusion is a rectangular parallelepiped having a square bottom face and has the dimension to satisfy the following formula (5) and formula (6):

$$1/50 \times \Phi \leq W \leq 1/25 \times \Phi \qquad \text{Formula (5)}$$

(wherein, W indicates the length of the base of the rectangular parallelepiped; and $\Phi$ indicates the outside diameter of the cone shape bottom of the umbrella dispersing plate), $$t \geq 1/5 \times W \qquad \text{Formula (6)}$$

(wherein, t indicates the height (thickness) of the rectangular parallelepiped; and W indicates the length of the base of the rectangular parallelepiped), Requirement (2): The height of the weir satisfies the following formula (7) that is represented in mm unit, $$25 \leq h \leq H \qquad \text{Formula (7)}$$

(wherein, h indicates the height of the weir; and H indicates the vertical distance (height) from the cone shape apex to the bottom of the umbrella dispersing plate).

2. The countercurrent direct-heating heat exchanger according to claim 1, characterized in that the above feed nozzle has a double pipe structure having its center part closed and its circumference opened at its cross section of the opening.

3. The countercurrent direct-heating heat exchanger according to claim 1, characterized in that furthermore a storing chamber for the above fluid to be heated is installed between the above feed pipe and feed nozzle.

4. The countercurrent direct-heating heat exchanger according to claim 3, characterized in that the volume of the above storing chamber for the fluid to be heated satisfies the following formula (4):

$$8 \times (Dp)^3 \leq V \leq 27 \times (Dp)^3 \qquad \text{Formula (4)}$$

(wherein, V indicates the volume of the storing chamber; and Dp indicates the inside diameter of the feed pipe).

5. The countercurrent direct-heating heat exchanger according to claim 1, characterized in that the distance between the bottom end of the above feed nozzle and the apex of the above umbrella dispersing plate satisfies the following formula (3):

$$1/2 \times Dn \leq X \leq Dn \qquad \text{Formula (3)}$$

(wherein, X indicates the distance between the bottom end of the feed nozzle and the apex of the umbrella dispersing plate; and Dn indicates the inside diameter of the feed nozzle).

6. The countercurrent direct-heating heat exchanger according to claim 1 further providing a preheating equipment of an ore slurry in a wet process for smelting of nickel oxide ore using a High Pressure Acid Leach, characterized in that the above fluid to be heated is a slurry of nickel oxide ore and the above heating medium is steam.

7. The countercurrent direct-heating heat exchanger according to claim 6, characterized in that the inner cross-sectional area (Sn) of the above feed nozzle has a cross-sectional area corresponding to the inside diameter (Dn) of the feed nozzle which is 25 mm or more.

8. The countercurrent direct-heating heat exchanger according to claim 2, characterized in that the distance between the bottom end of the above feed nozzle and the apex of the above umbrella dispersing plate satisfies the following formula (3):

$$\tfrac{1}{2} \times Dn \leq X \leq Dn \qquad \text{Formula (3)}$$

(wherein, X indicates the distance between the bottom end of the feed nozzle and the apex of the umbrella dispersing plate; and Dn indicates the inside diameter of the feed nozzle).

9. The countercurrent direct-heating heat exchanger according to claim 3, characterized in that the distance between the bottom end of the above feed nozzle and the apex of the above umbrella dispersing plate satisfies the following formula (3):

$$\tfrac{1}{2} \times Dn \leq X \leq Dn \qquad \text{Formula (3)}$$

(wherein, X indicates the distance between the bottom end of the feed nozzle and the apex of the umbrella dispersing plate; and Dn indicates the inside diameter of the feed nozzle).

10. The countercurrent direct-heating heat exchanger according to claim 4, characterized in that the distance between the bottom end of the above feed nozzle and the apex of the above umbrella dispersing plate satisfies the following formula (3):

$$\tfrac{1}{2} \times Dn \leq X \leq Dn \qquad \text{Formula (3)}$$

(wherein, X indicates the distance between the bottom end of the feed nozzle and the apex of the umbrella dispersing plate; and Dn indicates the inside diameter of the feed nozzle).

11. The countercurrent direct-heating heat exchanger according to claim 2 further providing a preheating equipment of an ore slurry in a wet process for smelting of nickel oxide ore using a High Pressure Acid Leach, characterized in that the above fluid to be heated is a slurry of nickel oxide ore and the above heating medium is steam.

12. The countercurrent direct-heating heat exchanger according to claim 3 further providing a preheating equipment of an ore slurry in a wet process for smelting of nickel oxide ore using a High Pressure Acid Leach, characterized in that the above fluid to be heated is a slurry of nickel oxide ore and the above heating medium is steam.

13. The countercurrent direct-heating heat exchanger according to claim 4 further providing a preheating equipment of an ore slurry in a wet process for smelting of nickel oxide ore using a High Pressure Acid Leach, characterized in that the above fluid to be heated is a slurry of nickel oxide ore and the above heating medium is steam.

14. The countercurrent direct-heating heat exchanger according to claim 5 further providing a preheating equipment of an ore slurry in a wet process for smelting of nickel oxide ore using a High Pressure Acid Leach, characterized in that the above fluid to be heated is a slurry of nickel oxide ore and the above heating medium is steam.

15. The countercurrent direct-heating heat exchanger according to claim 2, characterized in that furthermore a storing chamber for the above fluid to be heated is installed between the above feed pipe and feed nozzle.

16. The countercurrent direct-heating heat exchanger according to claim 11, characterized in that the inner cross-sectional area (Sn) of the above feed nozzle has a cross-sectional area corresponding to the inside diameter (Dn) of the feed nozzle which is 25 mm or more.

17. The countercurrent direct-heating heat exchanger according to claim 12, characterized in that the inner cross-sectional area (Sn) of the above feed nozzle has a cross-sectional area corresponding to the inside diameter (Dn) of the feed nozzle which is 25 mm or more.

18. The countercurrent direct-heating heat exchanger according to claim 13, characterized in that the inner cross-sectional area (Sn) of the above feed nozzle has a cross-sectional area corresponding to the inside diameter (Dn) of the feed nozzle which is 25 mm or more.

19. The countercurrent direct-heating heat exchanger according to claim 14, characterized in that the inner cross-sectional area (Sn) of the above feed nozzle has a cross-sectional area corresponding to the inside diameter (Dn) of the feed nozzle which is 25 mm or more.

\* \* \* \* \*